United States Patent [19]

Sewell

[11] 4,007,309

[45] Feb. 8, 1977

[54] SAG RESISTANT HONEYCOMB LOAD SPACER

[75] Inventor: James Sewell, Ypsilanti, Mich.

[73] Assignee: Narad, Inc., Wayne, Mich.

[22] Filed: July 12, 1973

[21] Appl. No.: 378,643

[52] U.S. Cl. .............................. 428/116; 156/197; 428/182; 428/184; 428/185; 428/186

[51] Int. Cl.$^2$ ..................... B32B 3/12; B32B 3/28

[58] Field of Search ............ 161/68, 127, 135, 137; 156/197, 290, 300; 105/369 R, 369 B; 428/179, 182, 184, 186, 116, 118, 185

[56] References Cited

UNITED STATES PATENTS

| 3,112,184 | 11/1963 | Hollenbach | 161/68 X |
|---|---|---|---|
| 3,205,109 | 9/1965 | Schudel | 156/197 |
| 3,227,599 | 1/1966 | Holland | 161/68 |
| 3,342,666 | 9/1967 | Hull | 161/135 |
| 3,593,671 | 7/1971 | Bramlett | 105/369 B |

Primary Examiner—George F. Lesmes
Assistant Examiner—P. J. Thibodeau
Attorney, Agent, or Firm—Bacon & Thomas

[57] ABSTRACT

An expandable honeycomb structure adapted to be suspended between stacks of articles of freight or between a stack of articles of freight and a wall and having spaced strips of relatively stiff material defining certain cell walls to resist sagging of the structure by its own weight and undue "hour glass" distortion due to vertical elongation of certain of the cells. In one embodiment readily foldable strips are interspersed with relatively stiff strips of corrugated paperboard having their corrugations running lengthwise.

1 Claim, 3 Drawing Figures

SAG RESISTANT HONEYCOMB LOAD SPACER

BACKGROUND OF THE INVENTION

This invention is in the field of dunnage devices and particularly such devices formed of expandable honeycomb slabs.

Expandable honeycomb slabs of sheet material, usually corrugated paperboard, have been used for dunnage in loads of freight. They are usually suspended in position and held expanded by their own weight. When such a spacer structure is suspended from its top, and particularly if it is of considerable depth, the weight of the honeycomb structure tends to elongate at least the upper and mid portions and the cells therein in a vertical direction and thus draw the lateral edges of the structure inwardly to an "hour glass" shape to an excessive degree. U.S. Pat. No. 3,593,671, issued July 20, 1971, to Glenn D. Bramlett, assigned to the assignee of the present application, describes one proposal for eliminating excessive hourglassing. The present invention is an improvement thereon.

SUMMARY OF THE INVENTION

The present invention largely eliminates the hourglass effect described above by replacing some of the freely foldable strips of material normally used to form the honeycomb with relatively stiff strips to resist undue vertical elongation of the cells of an expandable honeycomb structure.

DESCRIPTION OF THE PREFERRED EMBODIMENTS

Figure 1:
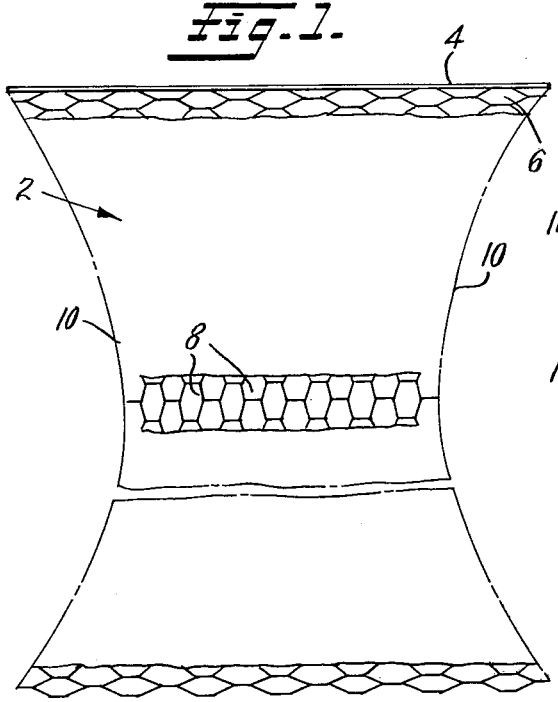
FIG. 1 is a schematic view of an expanded honeycomb structure, illustrating the undesirable hourglass effect.

The use of expandable honeycomb slabs as dunnage devices in loads of freight is known and the construction of the honeycomb slabs is more or less conventional. The honeycomb structure usually comprises strips of double-faced corrugated paperboard or the like superimposed to define a stack of flat strips with adjacent strips being adhered at spaced and staggered positions so that the stack may be expanded to open-celled honeycomb configuration. When such a structure is suspended, and particularly if the vertical dimension is considerable, the weight of the material forming at least the lower portion of the structure is sufficient to unduly stretch the slab in a vertical direction and thus draw opposite side edges of the spacer structure inwardly more than is desired. FIG. 1 illustrates the honeycomb effect referred to. In that figure, numeral 2 indicates generally the conventional honeycomb slab expanded from a stack of strips adhered as described above. Conventionally, the upper edge of the slab is adhered to a rigid member 4 by which it is suspended in the desired location. As illustrated, the upper cells 6 expand downwardly but as one moves downwardly along the slab, the cells are expanded a greater amount in a vertical direction and reach a maximum somewhere between the top and bottom, as illustrated by the cells 8. The cells near the bottom of the slab are not usually unduly elongated in the vertical direction because the weight of the slab material therebelow is small. Since the strips of material from which the honeycomb structure is formed are substantially inextensible and of constant total length, the side edges 10 of the slab necessarily are drawn inwardly. FIG. 1 illustrates the hourglass effect in a somewhat exaggerated manner but it is obvious that when such a structure is intended to be positioned between stacks of articles of freight, the narrow portions of the slab may not engage and hold all of the articles in this stack.

Figure 2:
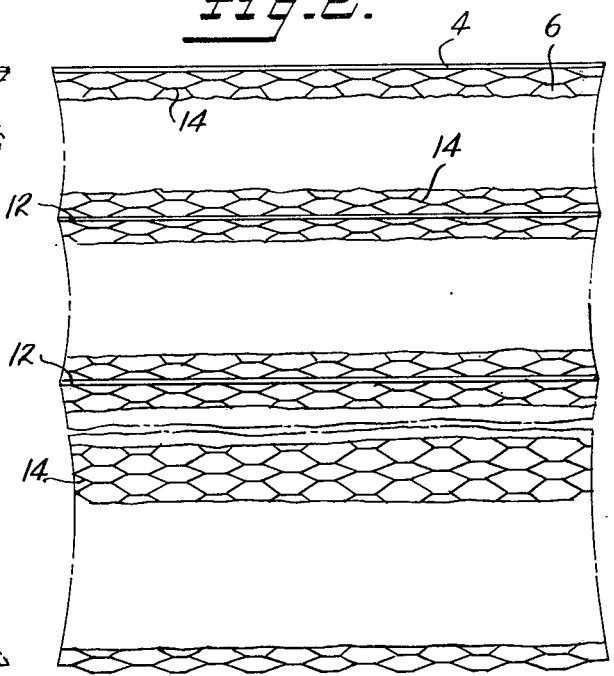
FIG. 2 is a schematic view similar to FIG. 1 but showing an expanded honeycomb structure embodying the present invention.
Figure 3:
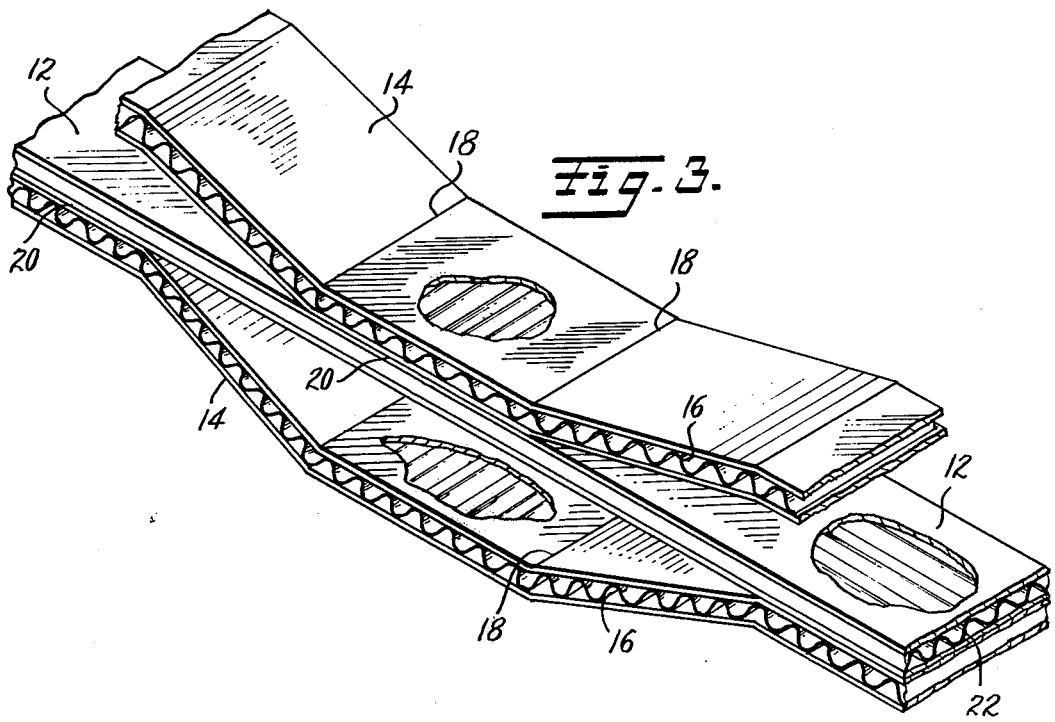
FIG. 3 is a fragmentary perspective view of a portion of FIG. 2.

FIGS. 2 and 3 illustrate the improvement of the present invention and wherein numeral 4 also indicates a stiff or rigid supporting member. In constructing conventional honeycomb devices, all of the strips of material are readily bendable in a direction transverse to their length and are usually scored or otherwise treated adjacent those regions where they are secured to other strips to facilitate bending and opening of the cells. This ready bendability encourages the hourglass effect previously described. The present invention comprises the interposition in the stack of bendable strips of a plurality of relatively stiff strips 12 which are highly resistant to bending or folding although it is preferred that they be not completely rigid as is the member 4. By providing a relatively stiff strip 12, the effect illustrated in FIG. 2 is produced wherein only a small amount of hourglass distortion occurs between the strips 12 or between a strip 12 and the supporting member 4. Preferably, the strips 12 are placed in the stack of strips during manufacture only after a plurality of readily bendable strips have been assembled. In other words, the relatively stiff strips 12 are separated in the stack by a plurality of flexible strips. It has been found that in a slab having, for example, 16 plies of strip material two stiff strips 12 are adequate, spaced, for example, as the fifth and 10th strips from the top.

The relatively stiff strips 12 may be of any suitable material having the desired characteristics and by way of example, FIG. 3 illustrates one suitable form. In FIG. 3, numerals 14 identify readily bendable strips of material each comprising double-faced corrugated paperboard arranged with its corrugations 16 extending transverse to the length of the strips and those strips are conventionally provided with score lines at 18 to facilitate bending thereof at the edges of those areas that are adhered to adjacent strips, such as the areas 20. The relatively stiff strips 12 may likewise be of double-faced corrugated paperboard but are constructed with their corrugations 22 extending lengthwise of the strip to thus give the strip considerable rigidity and stiffness. While FIG. 3 shows the honeycomb structure as being expanded with the strips 12 remaining substantially straight, it is to be understood that the strips 12 will bend or fold slightly although they will resist such bending and maintain the expanded structure in generally the form illustrated schematically in FIG. 2.

As stated previously, the strips 12 may be of any suitable material, not necessarily corrugated paperboard. If made of corrugated paperboard, they should be of slightly heavier weight than the other strips in the stack. They could, for example, be a solid paperboard structure or the like. Applicant has found that normally only about two relatively stiff strips are needed for each honeycomb structure and it is preferred that they be separated by about four or five readily bendable strips 14. It has also been found that the provisions of the relatively stiff strips is necessary only in the upper two-thirds of the honeycomb structure.

While a limited number of specific embodiments have been shown and described, it is understood that other modifications may be resorted to within the scope of the appended claims.

I claim:

1. A structure expandable to form a honeycomb structure comprising a stack of elongated generally flat strips of sheet material, the strips of said stack being secured to adjacent strips at spaced and staggered positions whereby said stack may be expanded to define a honeycomb slab having a multiplicity of cells; a majority of said strips being readily foldable along lines transverse thereto, at least adjacent those regions where they are secured to adjacent strips; the strips other than said majority of said stack being stiffer, in a direction lengthwise thereof, than said majority of stirps and resistant to folding along said transverse lines, said other strips being relatively few in number and being separated in said stack by a plurality of said majority of strips whereby said other strips prevent undue vertical elongation of said cells when said slab is suspended from its upper edge portion, said majority of strips comprising corrugated paperboard arranged with the corrugations thereof extending transversely of said strips; said other strips being of corrugated paperboard arranged with the corrugations thereof extending lengthwise of said strips.

* * * * *